United States Patent [19]
Rodriguez

[11] Patent Number: 5,983,091
[45] Date of Patent: *Nov. 9, 1999

[54] PORTABLE COMMUNICATION UNIT WITH DISCRETE ALLOCABLE BLOCKS OF AIRTIME

[75] Inventor: Manuel Rodriguez, St. Petersburg, Fla.

[73] Assignee: Omni Telecommunications, Inc., Mankato, Minn.

[*] Notice: This patent issued on a continued prosecution application filed under 37 CFR 1.53(d), and is subject to the twenty year patent term provisions of 35 U.S.C. 154(a)(2).

[21] Appl. No.: 08/369,003

[22] Filed: Jan. 5, 1995

[51] Int. Cl.$^6$ ................................................ H04Q 7/32
[52] U.S. Cl. .......................................... 455/405; 379/112
[58] Field of Search ................................ 379/58, 60, 62; 455/405

[56] References Cited

U.S. PATENT DOCUMENTS

| | | | |
|---|---|---|---|
| 4,640,986 | 2/1987 | Yotsutani et al. | 379/60 |
| 4,724,537 | 2/1988 | Monet | 379/58 |
| 4,776,000 | 10/1988 | Parienti | 379/62 |
| 4,776,003 | 10/1988 | Harris | 379/91 |
| 4,831,647 | 5/1989 | D'Avello et al. | 379/91 |
| 4,860,336 | 8/1989 | D'Avello et al. | 379/63 |
| 4,860,341 | 8/1989 | D'Avello et al. | 379/91 |
| 4,870,679 | 9/1989 | Hanna | 379/114 |
| 4,879,744 | 11/1989 | Tasaki et al. | 379/144 |
| 4,905,301 | 2/1990 | Krolopp et al. | 455/34 |
| 4,908,848 | 3/1990 | Hanawa | 379/63 |
| 4,951,308 | 8/1990 | Bishop et al. | 379/91 |
| 4,955,049 | 9/1990 | Ghisler | 379/58 |
| 5,068,889 | 11/1991 | Yamashita | 379/62 |
| 5,068,891 | 11/1991 | Marshall | 379/91 |
| 5,109,401 | 4/1992 | Hattori et al. | 379/58 |
| 5,127,040 | 6/1992 | D'Avello et al. | 379/58 |
| 5,138,650 | 8/1992 | Stahl et al. | 379/61 |
| 5,144,649 | 9/1992 | Zicker et al. | 379/59 |
| 5,222,122 | 6/1993 | Hamilton | 379/32 |
| 5,265,155 | 11/1993 | Castro | 379/112 |
| 5,272,747 | 12/1993 | Meads | 379/59 |
| 5,274,368 | 12/1993 | Breeden et al. | 340/825.31 |
| 5,283,817 | 2/1994 | Hara et al. | 379/61 |
| 5,325,418 | 6/1994 | McGregor et al. | 379/59 |
| 5,327,482 | 7/1994 | Yamamoto | 379/61 |
| 5,329,589 | 7/1994 | Fraser et al. | 379/91 |
| 5,353,335 | 10/1994 | D'Urso et al. | 379/67 |
| 5,359,182 | 10/1994 | Schilling | 235/380 |
| 5,359,183 | 10/1994 | Skodlar | 235/493 |
| 5,359,642 | 10/1994 | Castro | 379/121 |
| 5,361,297 | 11/1994 | Ortiz et al. | 379/130 |
| 5,376,931 | 12/1994 | Marrs | 340/825.44 |
| 5,440,621 | 8/1995 | Castro | 379/112 |
| 5,450,477 | 9/1995 | Amarant et al. | 379/93 |

OTHER PUBLICATIONS

Lissette Machado, Making Cellular Renting Your Business, Oct. 1993, *All in Communications Magazine*, p. 24.

Advertisement for Next Edge, Oct. 1993, *All in Communications Magazine*, p. 61.

Advertising Flyer by Omni Cellular Ltd., a 1993 publication.

Omex Communications, User's Programming Instructions, a 1993 publication.

*Primary Examiner*—William Cumming
*Attorney, Agent, or Firm*—Gardner, Carton & Douglas

[57] ABSTRACT

A portable communication unit that operates based upon predetermined discrete blocks of airtime. The unit may be operated as a conventional portable communication unit when airtime is available, and operation of the unit for conventional communication is disabled when all the airtime has been used. By entering a specific code, which may be supplied by a dealer, the user may activate an additional block of airtime. Two classes of airtime may be provided; home time airtime which is used when the unit is within the area of a local or primary communication service provider, and roam time airtime which is used when the unit is outside of the area of a local or primary communication service provider. The unit may be programmed, preferably only by the dealer, with toll restrictor codes that limit the available range of numbers with which the unit may initiate a communication session.

7 Claims, 7 Drawing Sheets

Fig. 4a

```
              RESERVED
               ⌒
         183  00   052139    ← ESN
         ⌣         ⌣
    MANUFACTURER   UNIT
    IDENTIFICATION IDENTIFIER
```

```
            LOCAL
            NUMBER
             ⌒
        217  357  2308    ← MIN
        ⌣    ⌣
      AREA  DIALING
      CODE  PREFIX
```

21503   ← SID

2423    ← DEALER PASSWORD

02      ← CURRENT ROAM BLOCK

722     ← ROAM TIME

14      ← CURRENT HOME BLOCK

348     ← HOME TIME

```
  AREA  DIALING
  CODE  PREFIX
   ⌒     ⌒
   217   FFF  ⎫
   312   245  ⎬ ← TOLL RESTRICTOR CODES
   414   FFF  ⎪
   708   8FF  ⎭
```

Fig. 4b $$\left.\begin{array}{l}22416\\95603\\67291\\48905\\11721\\\bullet\\\bullet\\\bullet\\\bullet\end{array}\right\}\text{TABLE 1}$$

$$\left.\begin{array}{l}2\\1\\7\\3\\5\\7\\2\\3\\0\\8\end{array}\right\}\text{TABLE 2}$$

$$\left.\begin{array}{l}\text{ESN}\left\{\begin{array}{l}5\\2\\1\\3\\9\end{array}\right.\\\text{SID}\left\{\begin{array}{l}2\\1\\5\\0\\3\end{array}\right.\\\text{DEALER PASSWORD}\left\{\begin{array}{l}2\\4\\2\\3\end{array}\right.\end{array}\right\}\text{TABLE 3}$$

PORTABLE COMMUNICATION UNIT WITH DISCRETE ALLOCABLE BLOCKS OF AIRTIME

FIELD OF THE INVENTION

The present invention relates generally to the field of portable communication units, and more particularly to an improved portable communication unit that operates based upon discrete allocable blocks of airtime.

BACKGROUND OF THE INVENTION

With the advent of the cellular telephone communications systems, the portable communications industry has experienced tremendous growth. It is estimated that there are presently over 20 million Americans who own and operate a cellular telephone. In addition, there are several million Americans who have applied for service with a cellular telephone carrier, but have been denied service because of insufficient or a bad credit history. As a result, a significant segment of the potential market for the cellular telephone industry is excluded from receiving or even being considered for cellular telephone service.

The prior art discloses various techniques for operating a communication system base site to accept or deny a request for access from a communication unit. For example, U.S. Pat. No. 5,274,368 to Breeden et al., assigned to Motorola, Inc., discloses such a system where a communication base site processes predetermined identification codes to determine whether a particular request for access to the base site is authorized. U.S. Pat. No. 4,908,848 to Hanawa discloses another technique for operating the mobile communication system to restrict certain types of call operations. Again, the system proposed by Hanawa, like the Breeden et al. system, requires modification of the communication system base site to recognize particular unique codes associated with a request for service from a particular portable communication unit. The modifications suggested by such prior art systems, however, have not been widely nor consistently implemented.

Theft of portable communication service, particularly with respect to cellular telephone service, has been increasing at an alarming rate and now represents a major problem in the industry. In some cases, the portable communication service user is placed in an awkward position where hundreds or even thousands of dollars of unauthorized communication service has been charged to the account of the user. If the user is able to establish that such service was unauthorized, the portable communication service provider will lose the revenue for the service provided that was unauthorized. In addition to theft of service, theft of portable communication equipment has also been increasing. Portable communication equipment, which may not be recognized as stolen until significant unauthorized service has been used, is very costly to the user and the service provider.

SUMMARY OF THE INVENTION

The present invention addresses and overcomes the limitations of such prior art systems, by providing a unique portable communication unit that may be easily configured, for example by a dealer for such units, to provide portable communication service in discrete predetermined blocks of service time. A significant advance of the present invention over systems proposed by the prior art, is that the unique operational characteristics of the invention are implemented in the portable communication unit itself rather than the communication system base site. Thus, the unique features of the portable communication unit of the present invention operate independent of any communication system base site that it might communicate with. As a result, a portable communication unit in accordance with the present invention may, depending upon the configuration specified by the dealer, operate with all the functionality and versatility of a conventional portable communication unit, communicating with any number of different communication system base sites, depending upon the location of the portable communication unit.

Due to the limited amount of airtime available for the portable communication unit of the present invention at any particular time, the unit of the invention will not be desirable as a target for theft. For it is the substantial and virtually unlimited additional airtime that is the objective when a portable communication unit is stolen or used without authorization.

In addition to the foregoing advantages, the unique features of the present invention facilitate the creation of a new class of portable communication units, useful for a variety of unique and desirable service situations. For example, the portable communication unit of the present invention, which may operate for a predetermined yet limited period of time, is particularly suited to certain industries, such as for equipment repair or service personnel who are given a portable communication unit to facilitate communication during service calls. The limited amount of airtime is a feature that ensures that the unit is not used for significant periods of time when unauthorized. In addition, the portable communication unit of the present invention is also particularly well-suited for individuals with short term communications needs, such as on a rental basis, perhaps also in association with the rental of an automobile.

In accordance with one embodiment of the invention, when a user exhausts a block of airtime, the user may contact the dealer or manufacturer of the portable communication unit to obtain a code that may be entered to activate an additional block of airtime. Such codes are known to, or may be generated by the dealer, based upon several variables, some of which are unique to the particular portable communication unit. A dealer will, typically, require either a pre-payment or other assurance of payment before providing the user with a code to activate an additional block of airtime, particularly when the unit is used in the context of users who have special credit needs. When the correct code is input, an additional predetermined and discrete block of airtime is activated and may be used to operate the portable communication unit.

BRIEF DESCRIPTION OF THE DRAWINGS

The foregoing and other objects of the present invention will become apparent from the following detailed description taken in conjunction with the drawings in which:

FIGS. 4A and 4B are block diagrams showing the contents and organization of some of the information stored in the memory of the portable communication unit of the invention.

While the invention will be described in connection with certain preferred embodiments, it should be understood that it is not intended to limit the invention to those particular embodiments. To the contrary, it is intended to cover all alternatives, modifications and equivalents falling within the spirit and scope of the invention as defined by the appended claims. In particular, in some areas the following detailed description is cast in terms of one embodiment of the invention in the form of an improved cellular telephone handset. Such a specific description is provided only by way of example, however, and the unique and advantageous features of the invention, which are defined by the claims, are applicable to a much wider class of portable communication units that transmit and receive audio, visual and video information, as well as any of a variety of digitally encoded data, through any number of conventional communication protocols.

DETAILED DESCRIPTION OF THE INVENTION

Figure 1:
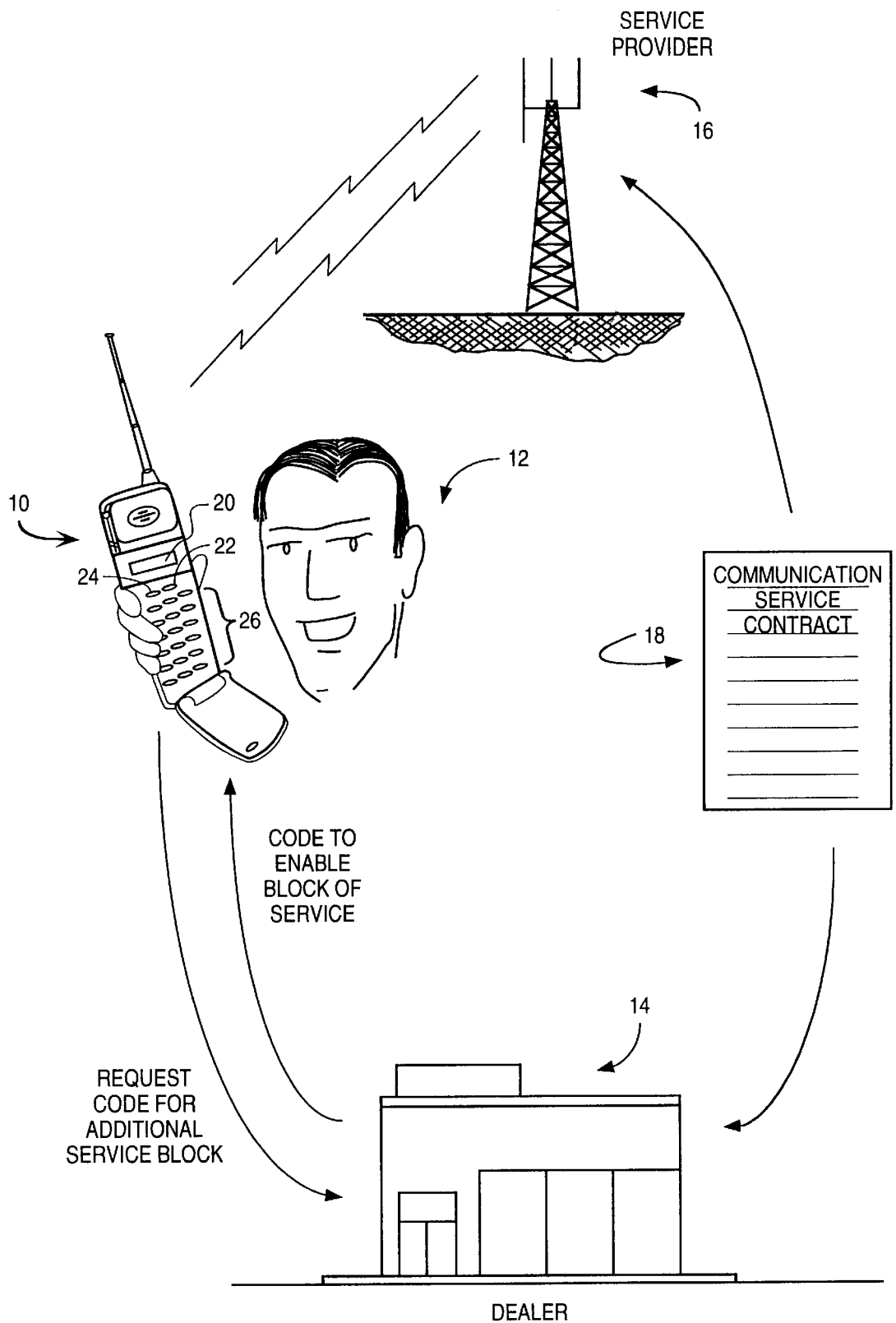
FIG. 1 is a graphical representation of a preferred environment for using the portable communication nit of the present invention.

Referring first to FIG. 1, there is illustrated a graphical representation of one general environment for use of the unique portable communication unit 10 of the present invention. A portable communication unit user 12 may obtain a portable communication unit 10, for example, from a commercial dealer 14 or similar vendor for portable communication equipment and services. Alternatively, the portable communication user 12 may separately purchase a portable communication unit 10 of the present invention and enter into an arrangement for service with a portable communication service dealer 14. As will be apparent, the portable communication unit 10 of the invention is particularly well-suited for situations where the individual desiring portable communication service has an insufficient or poor credit history, effectively barring the individual from obtaining portable communication service offered by conventional means directly through any number of portable communication carriers or service providers.

According to one embodiment of the invention, the portable communication service user 12 will contact a dealer 14 that offers the sale or use of a portable communication unit 10 in accordance with the present invention. As will be described in much greater detail in the following, the portable communication unit of the invention provides portable communication service in discrete blocks of service time. Thus, upon initial purchase or rental of a portable communication unit 10 according to the invention, or upon initial activation of portable communication service, the user will be able to use the portable communication unit for a predetermined, yet limited amount of airtime. For example, the unit 10 will typically have one block of airtime available so that the user may be able to use the unit for an aggregate of 45 minutes of airtime. After the current block of service time has been used, according to one arrangement, the user 12 may contact the dealer 14 to obtain a unique authorization code to be entered into the unit 10 to enable another block of service airtime. Typically, communication with the dealer 14 to obtain a code for additional airtime will also involve the user 12 authorizing the dealer to charge the additional block of airtime to the user's account with the dealer 14, or perhaps in some cases authorizing a charge to the credit card for the user 12. In other cases, the dealer 14, particularly with users that do not have an established or clean credit record, may require the user 12 to pre-pay for service time before the dealer 14 will provide the user 12 with codes for additional airtime.

According to one embodiment of the invention the portable communication unit 10 will operate based upon two different types of airtime. Home time airtime is used to operate the unit 10 when it is within the vicinity of a local service provider 16. Roam time airtime, on the other hand, is used to operate the unit 10 when it is outside of the vicinity of a local or primary service provider 16. Thus, the dealer 14 could be contacted by the user 12 to provide a code that could be used to activate an additional block of roam time airtime, or to provide a code that could be used to activate an additional block of home time airtime. As should be evident, in some cases certain users 12 may want to limit usage of their portable communication unit 10 for communication only within the vicinity of the local or primary service provider 16, and will therefore only activate blocks of home time airtime to operate the portable communication unit 10.

The portable communication unit 10 of the invention operates in a relatively conventional manner with respect to the portable communications service provider 16, such as a service provider for cellular communications service. Thus, the unique and advantageous features of the portable communication unit 10 of the invention are essentially "transparent" to the portable communication carrier or service provider 16. The particular portable communications carrier account or service contract 18 that provides service for the portable communication unit 10 of the invention, however, is, according to the illustrated arrangement, established and maintained by the dealer 14, rather than the user 12. As a result, a user 14 that otherwise might not meet the credit standards for an account with the service provider 16 may obtain portable communication service through the dealer 14 utilizing the portable communication unit 10 of the present invention that allocates airtime in discrete blocks. In some cases, of course, the service provider 16 could essentially "replace" the dealer 14 by establishing a similar relationship directly with the user 12 in conjunction with the unique portable communication unit 10 of the invention.

As can be seen in FIG. 1, the portable communication unit 10 according to the invention resembles and is nearly identical in appearance to a conventional cellular telephone. Like a conventional cellular telephone, the portable communication unit 10 includes a set of keys 26 that may be individually pressed, for example, to dial a number or to operate the unit 10 to perform other functions. As should be evident, the portable communication unit 10 depicted in FIG. 1 is illustrated as a cellular telephone by way of example, and the unique and advantageous functional features of the present invention may be readily implemented with respect to other portable communication units, including, for example, digital personal communications systems (PCS) which have voice, data and image communication capability. Preferably, the portable communication unit 10 will include an alphanumeric display 20 for prompting the user 12 and providing the user 12 with information regarding the status and other information regarding the unit 10. In addition, the portable communication unit 10 will preferably also include a menu key 22 which a user 12 can press to enter a menu system or otherwise specify a particular function or routine for the unit 10 to perform. For example, the menu key 22 would likely be pressed in combination with another key or keys to display to the user the remaining amount of home time airtime available in the unit. Another key combination with the menu key 22 could display the remaining amount of roam time airtime available in the unit. Similarly, the menu key 22 could be utilized with other key combinations to perform a routine where the user could enter a code for allocating an additional block of home time or roam time airtime.

According to a preferred embodiment of the invention, the portable communication unit will also be provided with at least one "emergency" or pre-authorized number which it can communicate with at any time, even if no additional home time or roam time airtime is available. Preferably, as illustrated, this emergency number will be preprogrammed by either the manufacturer or the dealer and can be immediately activated by pressing a dedicated "hot" key 24 provided on the unit 10. According to an alternative embodiment of the invention, such a "hot" key 24 might also allow the user 12 to use the portable communication unit 10 to contact the dealer 14 in order to request a code to allocate an additional block of airtime.

Figure 2:
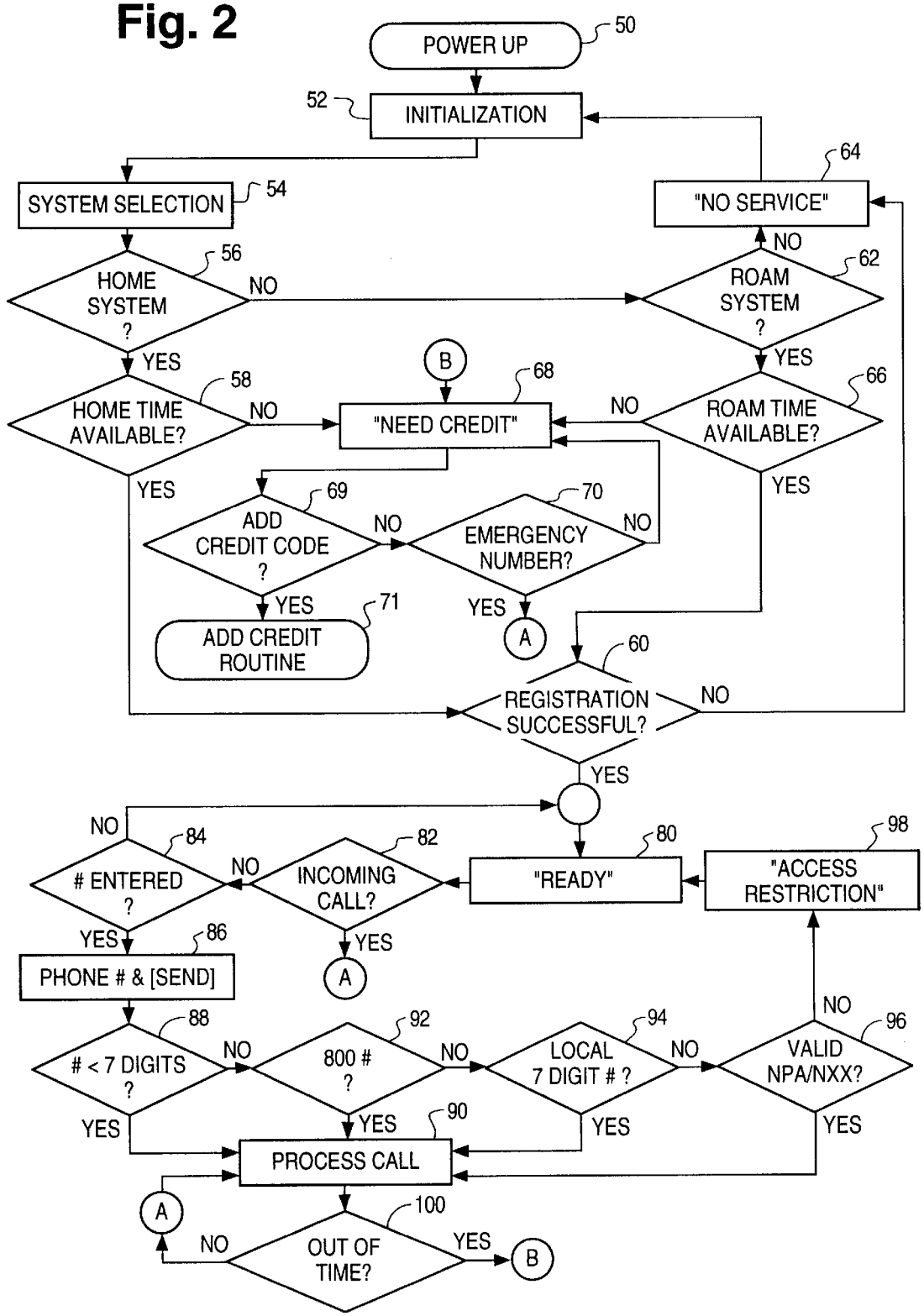
FIG. 2 is a schematic flow diagram illustrating some of the unique operational features of the present invention.

Turning now to FIG. 2, there is illustrated in flow diagram format the general operation of the portable communication unit according to one embodiment of the invention. Operation commences in Step 50 when initial power is supplied to the portable communication unit. Next, in Step 52, a general system initialization routine is performed where, perhaps, RAM memory for executing various portions of the routine is allocated and loaded with appropriate data and instructions from the PROM memory, and conventional diagnostic checks may be performed to ensure proper operation and configuration of the unit. In addition, certain general parameters relating to the unit itself are read from PROM memory, including, for example, the "Home" carrier station identification number in order for the unit to determine if it should operate in "Home" mode or in "Roam" mode. After initialization, the routine continues to Step 54 where, according to a conventional procedure, the portable communication unit operates to determine and select a communication carrier. Typically, this involves activating the transceiver of the unit, and "listening" for a signal from a local communication carrier system that provides identification and other information regarding the communication carrier system. Once such information is received by the unit, or the unit is unsuccessful in receiving such information from a local communication carrier, the procedure continues to Step 56. In Step 56, the station identification number (SID) associated with the portable communication unit is compared to the SID received from the local communication carrier system. If the two SID's are the same, the portable communication unit is in the area of its "Home" communication carrier, and the procedure continues to Step 58.

In accordance with an important feature of the present invention, the portable communication unit operates based upon discrete and individually allocable blocks of "airtime." According to one embodiment of the invention, there is provided two different types of airtime blocks, home time blocks and roam time blocks. Generally, home time blocks will allow the portable communication unit to engage in a communication session when in its home service area, while roam time blocks will be required for the unit to engage in a communication session when the unit is outside of the home service area. The station identification number (SID) is the parameter which is utilized to determine if the portable communication unit is within its home service area, is in a service area outside of its home service area, or if the unit is in an area where no service is available.

If, in Step 56, the comparison of the SID associated with the portable communication unit and the SID received from the communication carrier, if any, are not the same, the procedure continues to Step 62 to determine if the unit should operate in "Roam" mode, i.e., the unit is outside of its home service area. In Step 62, the SID information associated with the communication carrier is checked to determine if it falls within a predetermined authorized range. If the SID information associated with the communication carrier falls outside of a predetermined acceptable range of values, or the portable communication unit has not received SID information from any available communication carrier from Step 54, then the procedure continues to Step 64 to display a message indicating that the unit is presently in an area where no service is available. Otherwise, in Step 62, if the SID information associated with a communication carrier is determined to be valid, i.e., within a predetermined acceptable range, this is an indication that the unit is in a "Roam" service area, and the procedure continues to Step 66. If, in Step 66, the portable communication unit determines that roam time is available from a roam time block of airtime, the procedure continues to Step 60 to complete the registration process. Otherwise, in Step 66, if there is no roam time available from a roam time block, the procedure continues to Step 68 where a message is displayed indicating that the portable communication unit does not have any airtime left to complete the registration process and provide service to the user.

If in Step 58, the portable communication unit determines that home time is available from a home time block of airtime, the procedure continues to Step 60 to complete the registration process. Otherwise, in Step 58, if there is no home time available from a home time block, the procedure continues to Step 68 where a message is displayed indicating that the portable communication unit does not have any airtime left to complete the registration process and provide service to the user.

According to a preferred embodiment of the invention, the user of the portable communication unit will, even if no home time or roam time airtime is available, be able to engage in a communication session with at least one predetermined number, such as an emergency telephone number. When the procedure has reached Step 68 and the "Need Credit" message is displayed, and digits from the keypad of the unit are depressed, the procedure will continue to Step 69 to determine if the sequence of digits consists of a predetermined code for activating the routine to add additional home or roam time credit. If, in Step 69, the particular predetermined sequence is received to activate the add credit routine, which may be comprised of, perhaps, the menu key 22 (FIG. 1) in conjunction with another numeric key, the procedure continues to Step 71 where the Add Credit Routine is performed. Otherwise, in Step 69, the procedure continues to Step 70 where the digits entered are analyzed to determine if they correspond to an emergency or other pre-authorized number which does not require airtime from home blocks or roam blocks to process the call. For example, according to a preferred embodiment of the invention, the portable communication unit of the present invention will allow at least one predetermined emergency number to be processed, which may be activated, for example, by pressing a dedicated "hot" key 24 (FIG. 1), even if no home block or roam block airtime is available. This feature of the invention ensures the user that, even though all home time and roam time airtime might be used up, the portable communication unit will still be able to provide the user with the ability to process a call to an emergency number and contact emergency personnel, since such a portable communication unit is widely recognized as an indispensable device to alert authorities in the event of an emergency situation. If such a pre-authorized emergency number is entered, the procedure jumps from Step 70 to Step 90 to a routine that processes the call. As should be evident, in addition to an emergency telephone number, the portable communication unit of the present invention may also be programmed to recognize other pre-authorized numbers, such as the telephone number corresponding to the dealer so that the user can communicate with the dealer to obtain the information required to add another home time or roam time block of airtime.

In Step 60 the portable communication unit executes a conventional registration process with the portable communication service carrier, where, for example, information is exchanged regarding the type and identification of the portable communication unit and other conventional verification routines are performed. If registration is successful, the procedure continues to Step 80 where a "Ready" message is displayed and the unit remains ready to handle an incoming call or process a request to make an outgoing call. Otherwise, in Step 60, if registration is unsuccessful, the procedure loops back to Step 64 where a "No Service" message is displayed and the procedure continues back to the initialization step in another attempt at registration.

After the portable communication unit has been registered, if signals are received from the communication carrier indicating that an incoming call is available, the process jumps to Step 90 where the incoming call is processed in accordance with a relatively conventional portable communication call processing routine. Otherwise, if the user enters a number on the keypad, the procedure continues from Step 84 to Step 86 where information relating to the digits depressed on the keypad are received until terminated when the "Send" key is activated. Next, in Step 88, one of a possible series of checks are performed to determine if the number entered by the user is authorized. As will be described in greater detail, an important feature of the invention is that the portable communication unit may be provided with an access restriction profile, which limits the area for which long distance and even local calls may be placed.

In Step 88, the length of the number entered is checked; if the number is less than 7 digits, the procedure continues to Step 90, otherwise the procedure continues to Step 92 for further checking. A number which is less than 7 digits, will be processed since it likely pertains to an emergency number or possibly one of several special "star" numbers which may be offered by the communication carrier such as, for example, *611 for connection to an operator or special service that provides traffic or directional information. If the number is not less than 7 digits, the procedure continues to Step 92 where the number is checked to determine if it is a toll-free "800" number; if it is an "800" number, the procedure continues to Step 90 to process the call, otherwise, if the number is not an "800" number, the procedure continues to Step 94 for additional checking. In Step 94 the number entered is compared to the Mobile Identification Number (MIN) unique to and associated with the portable communication unit. If the area code and the dialing prefix, i.e., the first 3 of 7 numbers of a local number, of the MIN is the same as the number entered by the user, the number entered is a local number and the routine continues to Step 90 to process the call. Otherwise, in Step 94, if the area code and the dialing prefix of the MIN differs from that of the number entered by the user, the procedure continues to Step 96 for further checking. In Step 96, the number entered by the user is compared to a set of authorized pairs of area codes and dialing prefixes in order to determine if the number entered by the user is authorized. If, in Step 96, the comparison indicates that the number entered by the user is authorized, the procedure continues to Step 90 where the call is processed otherwise the number entered is not authorized and the procedure continues to Step 98 where a message, such as "Access Restriction" is displayed indicating that the number entered by the user is not authorized.

Except for the out-of-time step indicated in Step 100, the portable communication unit of the invention operates in Step 90 substantially as a conventional portable communication unit to process the call which has either been entered by the user or received by the carrier for connection to and communication with the portable communication unit. When a communication session has been established in Step 90, home time or roam time airtime, whichever is appropriate, will be decremented in accordance with the connection time for the communication. For example, if the portable communication unit is powered up, the unit determines, from signals received from the communication carrier that the unit is in a "home" area, registration is successful and the user has entered a local 7 digit number, in Step 90 after the appropriate connection is made, units of time corresponding to the duration of the call are decremented from the current home time block of airtime. During the processing of the call and any communication during Step 90, the home time or roam time airtime, whichever is appropriate, is decremented, and, in Step 100, the current block of airtime is checked to determine if the available airtime has been completely depleted. As should be evident, after a call is terminated in Step 90, the routine jumps back, for example, to Step 52, or possibly Step 80, where the portable communication unit remains "idle" until another number is entered by the user or an incoming call is received for the portable communication unit. If, however, the appropriate home time or roam time airtime is completely used up during a communication session in Step 90, the procedure, in Step 100, will usually branch back to Step 68, resulting in a termination of the call and display of the "Need Credit" message.

As should be evident, however, in the event a call to an emergency number is being processed, which might have been initiated, for example, in Step 70, an "emergency call" flag will be set. During Step 100, the routine determines that there is no more airtime for processing the call, the "emergency call" flag should be checked to determine if the number corresponding to the call is one of the pre-approved or emergency numbers allowed to be processed when all airtime in the unit has been used up. Thus, in Step 100, if the "emergency call" flag is set, an emergency call is presently being processed and the routine branches back to Step 90 to complete the emergency call, regardless of whether there is sufficient airtime to process the call. Otherwise, in Step 100, if there is no airtime remaining and the "emergency call" flag is not set, a regular call is presently being processed, and therefore the call is terminated and the routine branches back to Step 68 to display the "Need Credit" message.

Figure 3:
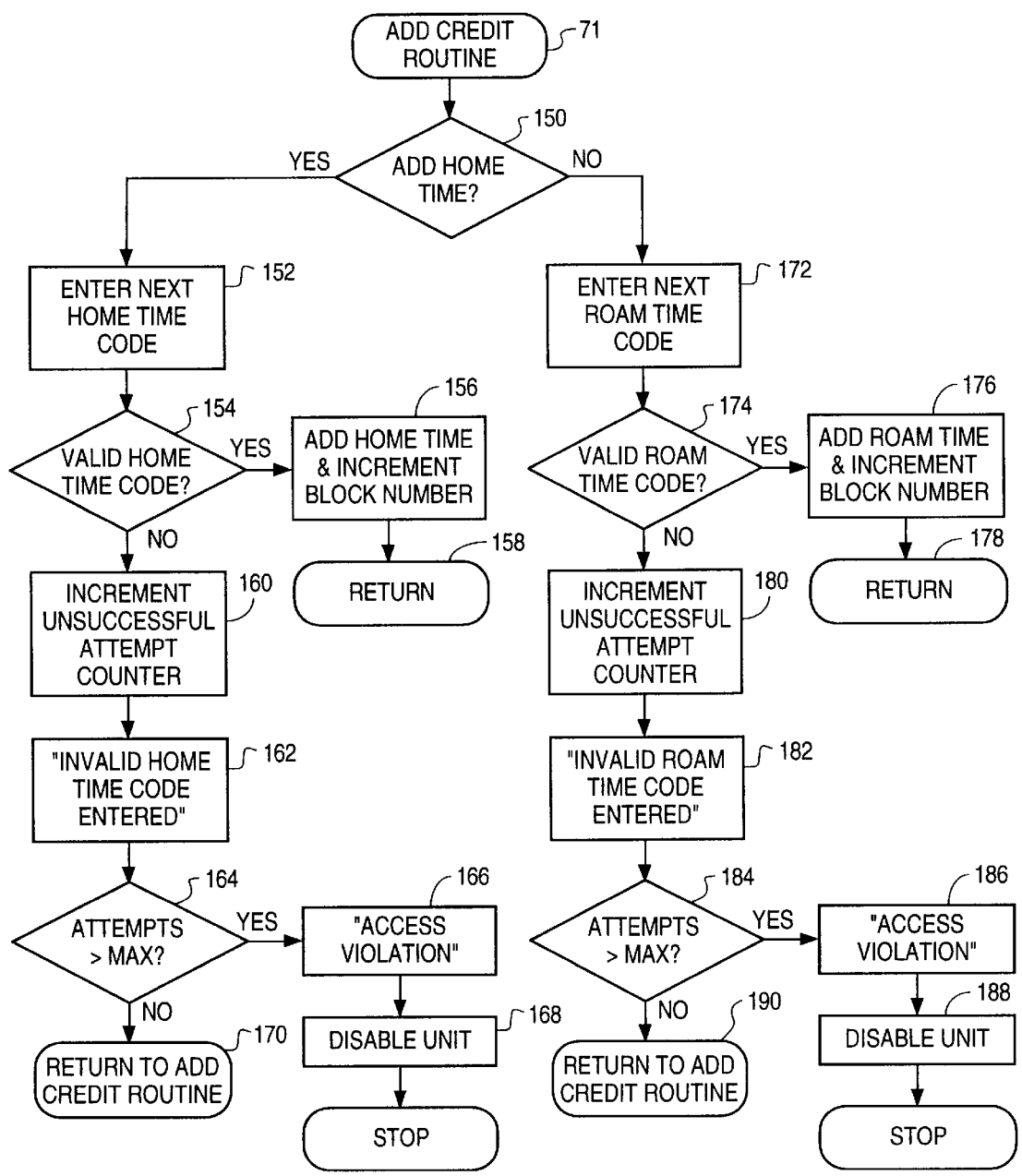
FIG. 3 is a schematic flow diagram illustrating the Add Credit Routine utilized by the user to allocate additional airtime for the portable communication unit of the invention.

Turning now to FIG. 3, there is illustrated a flow diagram of a routine according to one embodiment of the invention for adding an additional block of either home time or roam time airtime to the portable communication unit of the present invention. This routine might be entered, for example, by the user pressing the menu key 22 (FIG. 1) in combination with one or more predetermined numeric keys. The Add Credit Routine will typically be entered when the user enters a special keystroke sequence indicating that the user desires to access the Add Credit Routine. Alternatively, the portable communication unit of the present invention may be provided with an additional dedicated key for the user to activate in order to enter the Add Credit Routine.

The Add Credit Routine illustrated in connection with FIG. 3 relates to a routine where a single block of either home time or roam time airtime is activated when the appropriate code is entered into the portable communication unit. According to an alternative embodiment of the invention, which could be rather readily implemented by a modification to the software that operates the Add Credit Routine, more than one block of airtime could be added with a single code. In other words, the code entered could be checked by the routine to determine if it is one of several different codes, where each of the codes relates to an authorization to activate one or more blocks of airtime. Such a modification would, of course, likely result in a corresponding modification to the Code Generation Routine illustrated in FIG. 5. Thus, by such a modified routine, a user could obtain from the dealer a code that would activate two or more blocks of either home time or roam time airtime. The routine illustrated in FIG. 3, however, is limited to an implementation where a separate code must be entered in order to activate each additional block of airtime.

Referring to FIG. 3, after the Add Credit Routine is entered in Step 71, the procedure continues to Step 150 to determine if the user desires to add home time or roam time airtime. Preferably, the user will be prompted with an appropriate message in the display 20 (FIG. 1) of the portable communication unit. If, in Step 150, the user indicates that home time airtime is desired, the procedure continues to Step 152, where the user is prompted to enter the next unique code to allocate another block of home time airtime. According to a preferred embodiment of the invention, the user will only be able to receive such a code by contacting the portable communication unit dealer who will authorize and pre-approve the user for another block of home time airtime. In Step 154, the code entered by the user in Step 152 is compared to the next code generated by the portable communication unit to determine if the user has entered the correct code. As will be described in greater detail, the portable communication unit includes a routine to generate, preferably through an encryption technique, a sequence of such codes based upon a plurality of various parameters, some of which relate to information unique to the particular portable communication unit. In Step 154, if the code entered by the user is the same as the next home time code generated by the portable communication unit, the procedure continues to Step 156 where another block of home time is allocated and the home time block counter is incremented. Next in Step 158, the procedure returns to the point where it was called.

If, however, in Step 154, the code entered by the user differs from the next home time code generated by the portable communication unit, the procedure branches to Step 160 where a counter relating to unsuccessful attempts to enter another airtime code is incremented. Next, in Step 162, a message is displayed indicating that the home time code entered by the user in Step 152 was incorrect. In Step 164 the unsuccessful attempt counter is checked to determine if it exceeds a predetermined maximum number. According to this important and preferred feature of the invention, if the user enters a wrong airtime code more times than the predetermined maximum number, the portable communication unit of the invention will automatically disable and operation can only be enabled once again when the unit is returned to the dealer, or possibly the manufacturer, and reset. This important feature of the invention serves as a useful deterrent to theft or misuse of the portable communication unit, since any authorized user that attempts to repetitively and unsuccessfully "guess" and enter codes for additional airtime will be denied any further unauthorized use of the unit. On the other hand, if in Step 164 the user enters an incorrect home time code and the number of attempts is less than the predetermined maximum, the procedure, in Step 170, loops back to the Add Credit Routine for the user to attempt to enter the correct home time code once again.

As can be seen from FIG. 3, if, in Step 150, the user indicates that it is desired to enter additional roam time rather than additional home time airtime, the procedure branches to Step 172 where, in Steps 174 through Steps 190, there is provided a routine for checking and entering codes for additional roam time airtime similar to the routine set for in Steps 154 through Steps 170 with respect to adding additional home time airtime.

Turning now to FIG. 4A, there is illustrated, by way of example, a number of parameters used by the various operating routines of the portable communication unit in accordance with the present invention. As can be seen, the unit stores a plurality of different parameters required to properly operate and identify the unit. These parameters include, a number of relatively conventional parameters, such as the Electronic Serial Number (ESN), the Mobile Identification Number (MIN), and the Station IDentification (SID) associated with the particular portable communication unit. The ESN, is similar to a conventional serial number, in that it is a number unique to each portable communication unit and is typically assigned to the unit when the unit is manufactured. A full ESN is typically, when expressed in decimal or base 10 notation, 11 digits in length. The first three digits, correspond to and identify the manufacturer of the portable communication unit, the next two digits are reserved or unused, and the remaining 6 digits are a unique identifier for the unit. According to present embodiment of the invention, 5 of the last 6 digits of a full ESN are used. With reference to the ESN illustrated in FIG. 4A, the manufacturer identification portion of the ESN is "183", while the unit identifier is "052139", and the portion utilized by the processing routine of the present invention is the last 5 digits, or "52139."

The MIN, like the ESN, is also commonly unique to the particular portable communication unit and represents, essentially, the phone number associated with the unit. Usually, the MIN is ten numeric digits in length, and includes a three digit area code, a three digit dialing prefix and four additional digits. With reference to the MIN illustrated in FIG. 4A, the area code, represented by the first 3 digits, is "217", the dialing prefix, represented by the next 3 digits, is "357", while the local number, which is comprised of the dialing prefix and the last 4 digits, is "3572308." The SID, typically a five digit numeric code, identifies the "home" carrier station for the portable communication unit. The SID illustrated in FIG. 4A is "21503." Since many portable communication units may be assigned to the same carrier station, usually based upon geographic location of the dealer or the customer with respect to the nearest portable communication carrier station, the SID is almost always a code that is not unique to the particular portable communication unit.

The portable communication unit of the present invention also includes several parameters which are not found in conventional units, including a Dealer Password, Current Roam Block, Roam Time, Current Home Block, Home Time, and a set of Toll Restrictor Codes. The Dealer Password, comprised of, perhaps, 4 numeric digits as illustrated, is a code that identifies and is unique to a particular dealer for the portable communication unit. The Current Roam Block is an index parameter that represents the current number of the roam block. Thus, each time a roam block of airtime is used up, this parameter is incremented. With reference to FIG. 4A, the Current Roam Block is block number 2, indicating that 1 block of roam time airtime has already been used. The Roam Time is a parameter that represents the current amount of airtime available for operating the unit in roam time mode. Illustrated by way of example in FIG. 4A and assuming that the airtime parameter as illustrated in seconds, there is presently 722 seconds of roam time available in the current roam time block of airtime. The parameters Current Home Block and Home Time have a similar meaning in the context of home time.

It should be noted that the airtime parameter is illustrated in FIG. 4A in units of seconds only by way of example, and the airtime parameter may be based upon different unit. Furthermore, it should be noted that according to an alternative embodiment of the invention, it is possible that, when there is no additional roam time airtime remaining, home time airtime could be utilized to operate the unit while in a roam area. In this case, the home time airtime, which typically is less expensive than the roam time airtime, would preferably be decremented at a greater rate than if the unit were operating in a home area, in order to reflect the difference in the cost between the two rates. Similarly, when there is no additional home time airtime remaining, roam time airtime could be utilized to operate the unit while in a home area. In this case, the roam time airtime, which typically is more expensive than the home time airtime, would preferably be decremented at a lesser rate than if the unit were operating in a roam area, in order to reflect the difference in the cost between the two rates.

The set of Toll Restrictor Codes represents a number of different codes that specify the allowable combination of area codes and dialing prefixes that the portable communication unit may use for operation. Illustrated by way of example in FIG. 4A, the portable communication unit is presently programmed with a set of 4 Toll Restrictor Codes. The first Toll Restrictor Code is "217FFF", where "217" represents the allowed area code and "FFF" represents the associated allowed dialing prefix. As represented in FIG. 4A, a Toll Restrictor Code symbol of "F" refers to a type of "wild card" digit, where any digit will be allowed. Thus, with respect to the first Toll Restrictor Code, any dialing prefix will be allowed, as long as the area code is "217." The second Toll Restrictor Code, "312245", does not contain any "wild card" symbols and therefore will allow only the combination of an area code of "312" and a dialing prefix of "245." The third Toll Restrictor Code is "414FFF" and is similar to the first Toll Restrictor Code in that it allows any dialing prefix, but requires an area code of "414". The fourth Toll Restrictor Code, "7088FF", indicates an area code of "708" and a dialing prefix with a first digit of "8" followed by any 2 other digits. Thus, with respect to the fourth Toll Restrictor Code, the portable communication unit would be allowed to initiate a communication session with a number "7088234221", and would be allowed to initiate a communication session with a number "7088437904", but would be restricted from initiating a communication session with a number "7087337454." As can be seen from the foregoing examples, the set of Toll Restrictor Codes may be viewed as essentially a set of "masks" where an exact digit match must be present in a position where a specific digit is specified and any digit may be present where the "wild card" symbol of "F" is specified. Preferably, the portable communication unit will have sufficient memory to accommodate many different Toll Restrictor Codes in order to provide a wide variety of allowable numeric combinations with which the portable communication unit may initiate a communication session. The Toll Restrictor Codes, of course, do not necessarily restrict the portable communication unit from establishing a communication session with a number not allowed, as long as the session is initiated by the other party.

Some of the various parameters illustrated in FIG. 4A, will be set by the dealer when the portable communication unit is delivered to the customer. In particular, the MIN, SID, Dealer Password and Toll Restrictor Codes will typically be set by the dealer, and preferably can only be changed when the unit is given back to the dealer. The ESN, on the other hand, will typically be set by the manufacturer when the portable communication unit is manufactured. Thus, those parameters are generally not changed while the unit is in the possession of the user, and therefore remain the same until the unit is delivered back to the dealer. The other parameters, namely, the Current Roam Block, Roam Time, Current Home Block, and Home Time may be changed indirectly by the user through operation of the Add Airtime Routine or by using home time or roam time airtime through operation of the portable communication unit.

Illustrated in FIG. 4B is an example of how the various parameters used by the portable communication unit, as well as a set of randomly selected but predetermined numbers, might be stored in different tables in the memory of the portable communication unit in order to be utilized to generate the sequence of unique codes or "keys" to be checked against the numbers entered by a user to open additional blocks of airtime. As illustrated, there are provided three different tables of various lengths. Table1 stores a unique and random sequence of numbers used, in combination with numbers from the other tables, to generate the home time and roam time codes to be checked against the codes entered by a user to add additional airtime. The unique and preferably random sequence of numbers stored in Table1 may be specific to the particular portable communication unit in which they are stored. In any event, the sequence of numbers stored in Table1 does not change while the unit is in the possession of the user. Table2 stores the various digits comprising the ten digit mobile identification number (MIN) associated with the portable communication unit, while Table3 stores the various digits associated with the four digit electronic serial number (ESN), the five digit station identifier (SID), and the four digit dealer password.

Figure 5A:
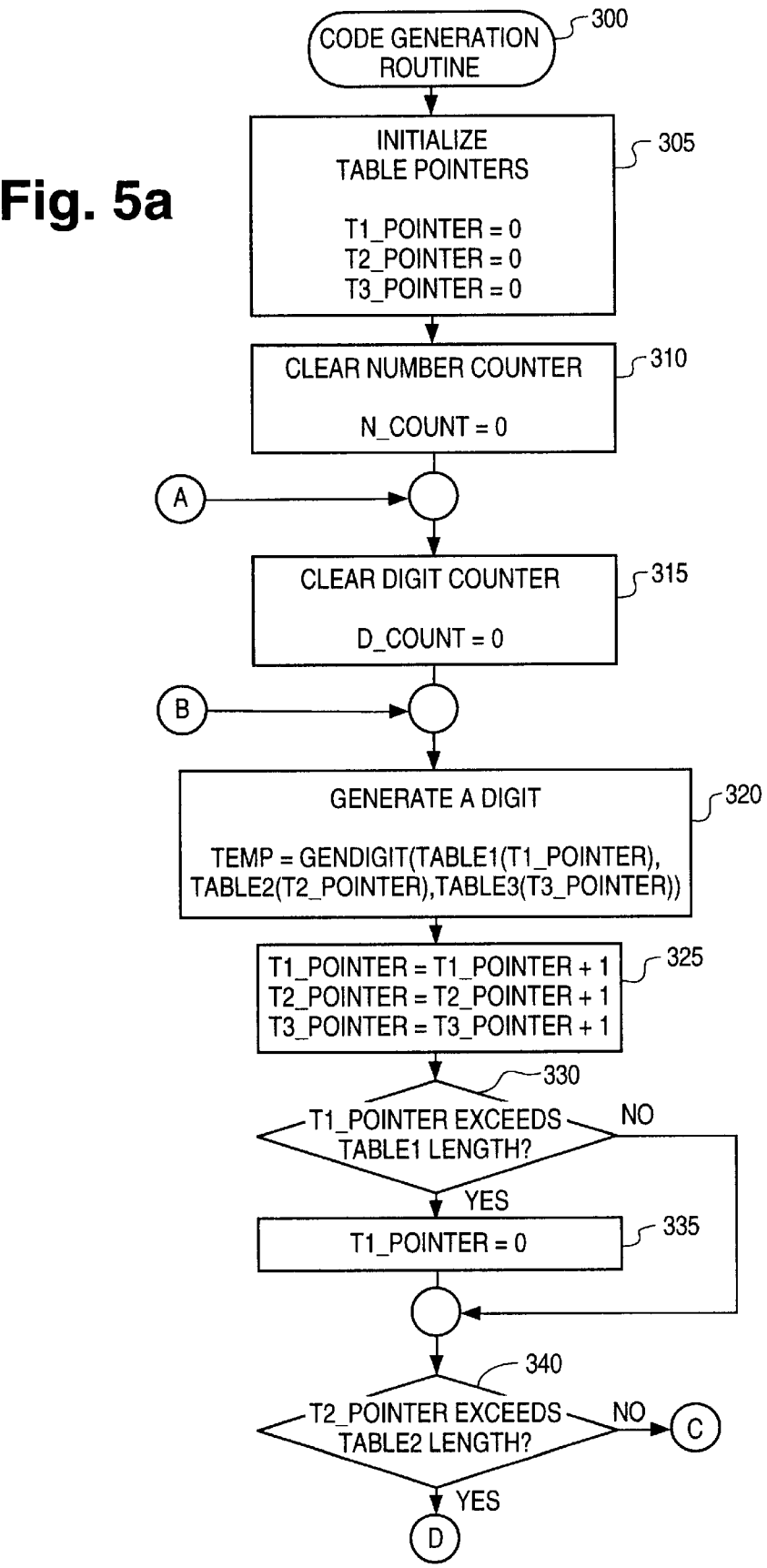
FIG. 5 is a schematic flow diagram illustrating the Code Generation Routine used to generate a set of unique codes which are checked against codes entered by a user to allocate additional airtime.
Figure 5B:
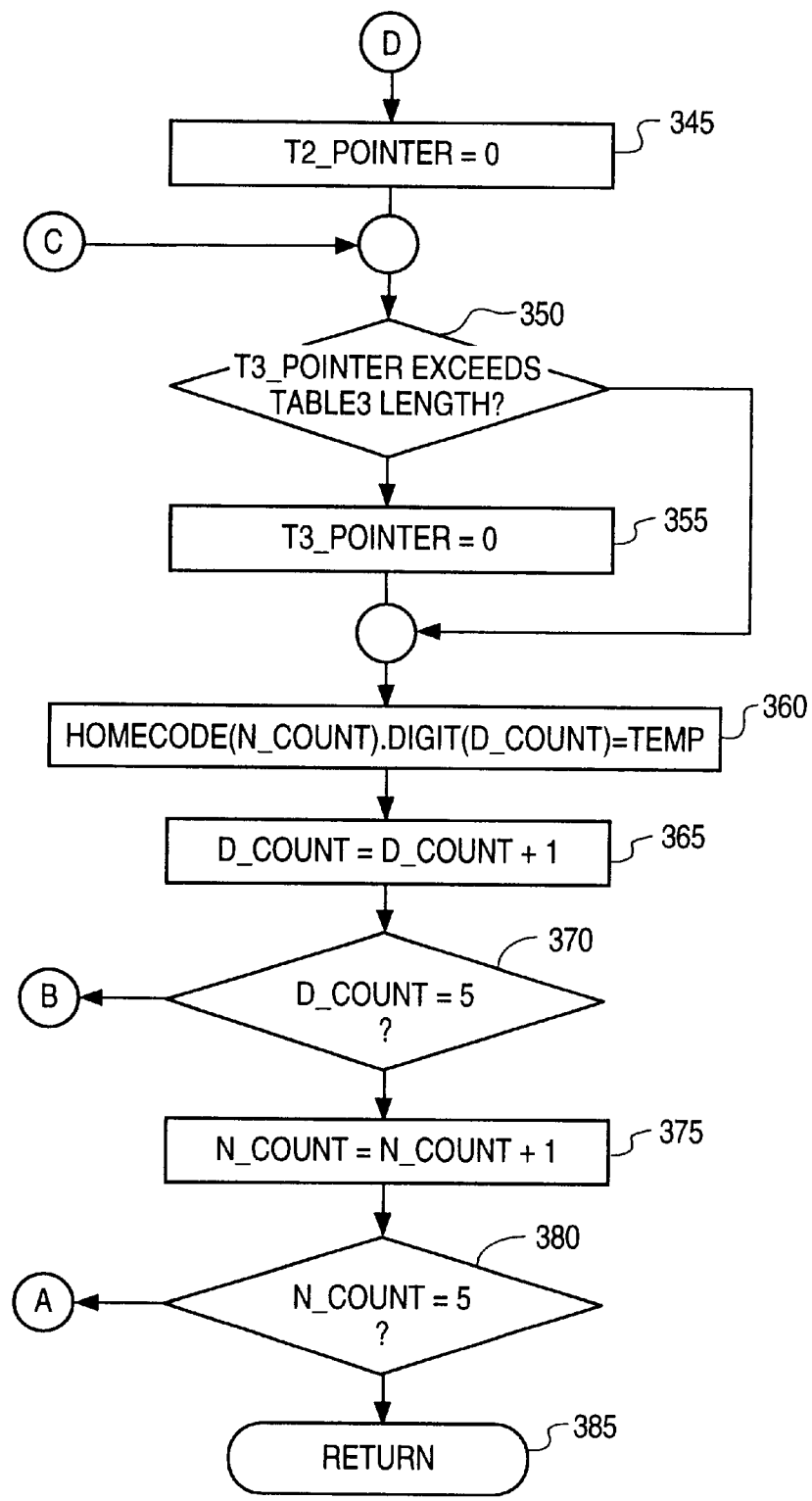

Turning now to FIG. 5, there is illustrated, by way of example, a routine for generating a set of codes corresponding to "keys" for opening additional home time blocks of airtime, based upon information set forth in the tables Table1, Table2 and Table3 as illustrated in FIG. 4. Although particular routine illustrated in FIG. 5 generates a set of home time codes, a set of roam time codes may be generated with a nearly identical routine. According to the example, there is a maximum number of 36 different five-digit codes, thus a maximum of 36 blocks of airtime, for either home time or roam time airtime may be allocated. After all the blocks are allocated the portable communication unit must be returned to the dealer to be reactivated. As should be evident, however, a different code generating routine could be implemented whereby an essentially endless number of codes may be generated. The Code Generation Routine illustrated in FIG. 5, operates by utilizing the information set forth in the tables, at least some of which is unique to the particular portable communication unit, and generates digit by digit the sequence of 36 roam time and home time codes. A digit generation routine, GenDigit generates a digit based upon three numeric parameters supplied. The GenDigit routine is preferably an encryption-type that generates a unique digit when supplied with numeric parameters.

After the Code Generation Routine is entered in Step 300, the procedure continues to Step 305 where a set of pointers or index variables, used to sequence through the various number stored in the different tables, are initialized such that they refer or index to the beginning number in each of the tables. The variables T1_POINTER, T2_POINTER and T3_POINTER are used as indexes to the various numbers stored, respectively, in Table1, Table2 and Table3. Next, in Step 310, the variable N_COUNT, which is used in the Code Generation Routine as a counter representing the current airtime block number, is cleared by setting it equal to 0. Similarly, in Step 315, the variable D_COUNT, which is used in the Code Generation Routine as a counter representing the current code digit for a particular airtime block number, is cleared by setting it equal to 0. Next, in Step 320, a unique digit is generated and assigned to the variable TEMP when the GenDigit is called and supplied with the table numbers indexed by the index variables. Thus, when the GenDigit routine is called for the first time, it will generate a number which is used as the first digit of the first code for the home time airtime block.

After a unique encrypted digit is generated from the GenDigit routine in Step 320, the procedure continues to Step 325 where the table pointers are incremented in preparation for generation of the next digit. Next, in Step 330, the pointer T1_POINTER is checked to determine if it exceeds the length of Table1; if it does, the procedure continues to Step 335 where T1_POINTER is reset to 0, otherwise the procedure continues to Step 340. Similarly, in Step 340, the pointer T2_POINTER is checked to determine if it exceeds the length of Table2; if it does, the procedure continues to Step 345 where the T2_POINTER is reset to 0, otherwise the procedure continues to Step 350. In Steps 350 and 355 the T3_POINTER is similarly checked and reset to 0 if it exceeds the length of Table3. Next, in Step 360, the digit generated by the GenDigit routine is assigned to the current digit of the current home time code number by setting the two-dimensional HOMECODE array, indexed by the N_COUNT and D_COUNT index variables, to the value of the variable TEMP generated by the GenDigit routine. Next, in Step 365, the digit counter variable, D_COUNT is incremented, and in Step 370 is checked to determine if all the digits for the current home time code have been generated. If all the digits for the current home time code have not yet been generated, the procedure branches back to Step 320 where another digit is generated. Otherwise, if all the digits for the current home time code have been generated, the procedure branches to Step 375 where the code number counter, N_COUNT is incremented. In Step 380, the value of N_COUNT is checked to determine if all the home time code numbers have been generated. If N_COUNT equals 37, all the home time code number have been generated and the routine returns in Step 385. If, in Step 380, not all the home time code numbers have yet been generated, the routine branches back to Step 315 where the digit counter D_COUNT is cleared in preparation for generating the first digit of the next home time code.

A similar routine to that illustrated in FIG. 5 may be used to generate codes used to activate additional blocks of roam time airtime.

As should be apparent from the foregoing description of the Code Generation Routine, the dealer, when requested by the user for an additional block of home time airtime, runs essentially an identical routine in order to provide the next authorized code to the user. Thus, all of the parameters associated with the particular portable communication unit of interest are preferably electronically stored and may be loaded and utilized in connection with the Code Generation Routine to generate the list of home time codes. The significant difference between the operation of the Code Generation Routine performed by the dealer and the routine performed by the portable communication unit is that the routine used by the dealer may be used to display, print out or otherwise output the codes, while the routine used by the portable communication unit itself, does not display or output the codes, but is limited to using the codes generated in order to verify that the user has entered the correct next code to activate the next block of airtime. By this process, the dealer may be assured that the user can only use additional airtime when authorized by the dealer, through providing the user with appropriate code to activate additional airtime.

According to an alternative arrangement, the Code Generation Routine might be run by the manufacturer of the portable communication unit, and the dealer, rather than performing the Code Generation Routine to determine the appropriate airtime codes, will be provided with a list of home time and roam time airtime codes generated by the Code Generation Routine in connection with each particular portable communication unit supplied to the dealer.

According to another alternative embodiment of the invention, an additional block of airtime for the portable communication unit might be activated without the need for any manual intervention by the user. For example, the portable communication carrier station could transmit an activation signal to the portable communication unit while the unit is in the process of registering with the station. In response to receiving such an activation signal upon registration, the unit could automatically activate an additional block of airtime. Such an activation signal would, of course, preferably only be transmitted when the dealer, or possibly the portable communication service provider, is assured that the user has adequate credit or has pre-paid for the additional block of airtime. Thus, according to such an alternative embodiment, the user would receive a portable communication unit from a dealer of portable communication equipment. Initially, the unit would be activated with an initial block of airtime, and the user would contact the dealer when the airtime is exhausted. When the dealer is satisfied that the user has sufficient credit for the additional block of airtime, the dealer will notify the portable communication carrier to transmit an activation signal when the portable communication unit attempts to register with the portable communication carrier station. Alternatively, such an activation signal could be transmitted at any time that the portable communication unit is engaged in a communication session with the portable communication carrier station.

According to yet another, although likely less desirable alternative arrangement, a portable communication unit in accordance with the invention could be configured such that an additional block of airtime could be activated manually by the dealer, such that the user would need to return to unit to the dealer when an additional block of airtime is desired. Such an embodiment might be useful in an environment where the unit is rented on a short term basis, for example, in conjunction with rented an automobile, perhaps, or other piece of equipment, where it is intended that the user will be returning the unit to the dealer within a relatively short period.

What is claimed is:

1. A portable communication unit capable of establishing a communication session according to a predetermined protocol, said unit comprising:

keypad means having a plurality of keys, memory means for storing a plurality of different parameters, including at least an identification code and a value relating to the amount of available service time, said value including at least a first class of service time related to a predetermined region and a second class of service time related to areas outside said predetermined region, service time allocation means for increasing the value relating to the amount of available service time in response to a predetermined code entered by activation of a corresponding sequence of said keys, display means for selectively displaying one or more of said parameters associated with said unit, communication means for establishing a communication session, means for decrementing the value relating to the amount of available service time, said decrementing means decrementing said first class of service time when said portable communication unit is within said predetermined region and said decrementing means decrementing said second class of service time when said portable communication unit is outside of said predetermined region, means for enabling said communication means when said value relating to the amount of available service time is greater than a predetermined value, and means for disabling said communication means when said value relating to the amount of available service time is less than said predetermined value.

2. A portable communication unit as set forth in claim 1 further comprising restriction means for limiting the available range of numbers with which said communication means may establish a communication session.

3. A portable communication unit as set forth in claim 2 wherein said restriction means includes a predetermined access restriction profile.

4. A portable communication unit according to claim 1 wherein said disabling means operates to disable said communication means and further wherein at least one pre-authorized and predetermined number is stored in said memory means with which the unit may initiate a communication session.

5. A portable communication unit according to claim 1 wherein said means for decrementing decrements said value of said first class of service time at a first rate during a communication session within said predetermined region and decrements said value of said second class of service time at a second rate during a communication session outside said predetermined region.

6. A portable communication unit according to claim 1 wherein said service time allocation means increases the value relating to the amount of available service time in response to an activation signal received by the unit while engaged in a communication session.

7. A portable communication unit according to claim 1 wherein said service time allocation means increases the value relating to the amount of available service time in response to an activation signal received by the unit during the process of registration of said portable communication unit.

* * * * *